//(12) United States Patent
Niwa et al.

(10) Patent No.: US 8,032,274 B2
(45) Date of Patent: Oct. 4, 2011

(54) DIAGNOSTIC SYSTEM FOR AUTOMATIC TRANSMISSION

(75) Inventors: Kenji Niwa, Nagoya (JP); Toshio Sugimura, Ann Arbor, MI (US); Masayasu Mizobuchi, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 472 days.

(21) Appl. No.: 12/308,229

(22) PCT Filed: Jul. 31, 2007

(86) PCT No.: PCT/IB2007/002193
§ 371 (c)(1),
(2), (4) Date: Dec. 10, 2008

(87) PCT Pub. No.: WO2008/015537
PCT Pub. Date: Feb. 7, 2008

(65) Prior Publication Data
US 2009/0157251 A1 Jun. 18, 2009

(30) Foreign Application Priority Data
Aug. 3, 2006 (JP) ................................ 2006-212328

(51) Int. Cl.
*G01M 13/02* (2006.01)
(52) U.S. Cl. ................ 701/29; 701/31; 701/51
(58) Field of Classification Search ........................ None
See application file for complete search history.

(56) References Cited

U.S. PATENT DOCUMENTS

| 4,414,863 A | 11/1983 | Heino |
| 2004/0226785 A1 | 11/2004 | Sugimura |

FOREIGN PATENT DOCUMENTS

| EP | 0 448 219 A1 | 9/1991 |
| EP | 1 022 494 A2 | 7/2000 |
| JP | A-04-203670 | 7/1992 |
| JP | A-11-280883 | 10/1999 |
| JP | A-2001-116134 | 4/2001 |
| JP | A-2003-294122 | 10/2003 |
| JP | A-2004-108540 | 4/2004 |
| JP | A-2004-340273 | 12/2004 |
| JP | A-2006-077892 | 3/2006 |
| JP | A-2006-170295 | 6/2006 |
| WO | WO 96/12127 A1 | 4/1996 |

*Primary Examiner* — Michael J. Zanelli
(74) *Attorney, Agent, or Firm* — Oliff & Berridge, PLC (57) ABSTRACT

A diagnostic system for an automatic transmission is provided in which a microcomputer determines that torque that can drive the driving wheels of the vehicle is not transmitted to an output shaft of the automatic transmission when the vehicle is stopped and the ignition key is operated to the OFF position, and performs forced energization of solenoids of solenoid valves associated with respective friction devices of the transmission, while monitoring current passing through the solenoid valves. If the current monitored does not match the current for energizing any of the solenoids, the microcomputer determines that the corresponding solenoid valve is at fault. Thus, the diagnostic system appropriately determines the presence of a fault of each solenoid valve for controlling the hydraulic pressure to each friction device, with increased flexibility and freedom.

12 Claims, 7 Drawing Sheets

| | C1 | C2 | C3 | C4 | B1 | B2 | B3 | B4 |
|---|---|---|---|---|---|---|---|---|
| P (PARKING) | | | | | | | | |
| R (REVERSE) | | | ○ | | | | | ○ |
| N (NEUTRAL) | | | | | | | | |
| FORWARD 1ST SPEED | ○ | | | (○) | (○) | | | (○) |
| FORWARD 2ND SPEED | ○ | | | (○) | | (○) | ○ | |
| FORWARD 3RD SPEED | ○ | | ○ | (○) | (○) | | △ | |
| FORWARD 4TH SPEED | ○ | ○ | △ | (○) | | | △ | |
| FORWARD 5TH SPEED | △ | ○ | ○ | | ○ | | △ | |
| FORWARD 6TH SPEED | △ | ○ | | | △ | ○ | △ | |

○:ENGAGED  (○):ENGINE BRAKE  △:ENGAGED BUT NOT TRANSMITTING POWER

FIG. 7 ns of the vehicle, and a selected one or ones of the friction devices is/are engaged while a selected one or ones of the friction devices is/are released so as to shift the transmission to the thus set target gear position. To engage each of the selected friction devices, the control system causes a required amount of current to be fed to the solenoid valve associated with the friction device to be engaged, so as to increase the opening of the solenoid valve and thus increase the hydraulic pressure applied to the friction device. To release each of the selected friction devices, the control system operates to de-energize the solenoid valve associated with the friction device to be released, so as to close the solenoid valve and reduce the hydraulic pressure applied to the friction device.
DIAGNOSTIC SYSTEM FOR AUTOMATIC TRANSMISSION The disclosure of Japanese Patent Application No. 2006-212328 filed on Aug. 3, 2006, including the specification, drawings and abstract is incorporated herein by reference in its entirety.

BACKGROUND OF THE INVENTION

1. Field of the Invention

The invention relates to a diagnostic system for an automatic transmission, which diagnoses an automatic transmission installed in a drive train of a vehicle to determine the presence of faults therein.

2. Description of the Related Art

As well known in the art, an automatic transmission installed in a drive train of the vehicle includes a plurality of friction devices, such as clutches and brakes, to which hydraulic pressure is selectively applied so as to engage the friction devices. With the selected friction device(s) thus engaged, a power transmission path, or a gear position of the transmission, is determined depending upon the operating conditions of the vehicle. More specifically, a hydraulic pressure source is provided which is driven through rotation of an output shaft of an internal combustion engine so as to supply hydraulic oil to each of the friction devices, and a plurality of solenoid valves are placed in conjunction with the respective friction devices. A control system, which performs various controls of the automatic transmission in integrated manners, controls the degrees of opening of the solenoid valves by controlling the amounts of current passed through the solenoid valves. In the automatic transmission of this type, a target gear position is set based on the operating conditions of the vehicle, and a selected one or ones of the friction devices is/are engaged while a selected one or ones of the friction devices is/are released so as to shift the transmission to the thus set target gear position. To engage each of the selected friction devices, the control system causes a required amount of current to be fed to the solenoid valve associated with the friction device to be engaged, so as to increase the opening of the solenoid valve and thus increase the hydraulic pressure applied to the friction device. To release each of the selected friction devices, the control system operates to de-energize the solenoid valve associated with the friction device to be released, so as to close the solenoid valve and reduce the hydraulic pressure applied to the friction device.

In the automatic transmission as described above, if a fault, such as disconnection or a short-circuit, occurs to a solenoid of any of the solenoid valves, the transmission may suffer a problem that, for example, a friction device to be engaged for shifting is not able to be engaged, or a problem that a friction device to be released for shifting is not able to be released. In this case, the automatic transmission may not be able to be shifted to the target gear position, or the automatic transmission may lock in itself, which naturally results in deterioration of the shifting performance of the automatic transmission.

Under the circumstances as described above, it has been proposed to provide hydraulic switches that operate in response to the hydraulic pressures of the respective friction devices that constitute the automatic transmission, and determine the presence of a fault of any of the solenoid valves by monitoring the outputs of the hydraulic switches. Such diagnostic systems are disclosed in, for example, JP-A-2001-116134 and JP-A-2006-77892. In these systems, the hydraulic switch provided for each of the friction devices generates an "ON" signal when the hydraulic pressure applied to the corresponding friction device is increased and the friction device is engaged, and generates an "OFF" signal when the hydraulic pressure applied to the corresponding friction device is reduced and the friction device is released. If, upon shifting of the automatic transmission to a target gear position during operation of the vehicle, the "OFF" signal is generated from the hydraulic switch associated with the friction device that is supposed to be engaged for shifting, for example, it is determined that the solenoid valve that controls the hydraulic pressure of the friction device in question is at fault. Thus, even in the event that a fault, such as disconnection or a short-circuit, occurs to a solenoid of any of the solenoid valves, the diagnostic system as described above makes it possible to perform a fail-safe process suitable for the fault condition, and thus prevent locking, or other malfunctions, of the automatic transmission in advance.

As discussed above, it is certainly possible to make fault diagnoses of the solenoid valves by monitoring the outputs of the hydraulic switches which correspond with the respective friction devices of the automatic transmission and operate in response to the hydraulic pressures of the friction devices. It is, however, to be noted that the hydraulic switches are adapted to generate the "ON" or "OFF" signals depending upon the operating (engaged/released) states of the corresponding friction devices, or changes in the states of the devices. Therefore, the frequency of diagnosing the solenoid valves inevitably varies from one solenoid valve to another, depending upon the manner of operating the automatic transmission itself, even though fault diagnoses may be performed on the solenoid valves in the above manner. Thus, if the transmission is less likely to be shifted to a certain gear position due to, for example, the driving practice of the driver, the frequency of diagnoses is naturally reduced with respect to each solenoid valve for regulating the hydraulic pressure applied to each friction device that is to be engaged for establishing the gear position. Thus, the diagnostic system still suffers a problem in terms of the flexibility or freedom with which fault diagnoses are performed.

SUMMARY OF THE INVENTION

The invention was developed in view of the situations as described above, and one aspect of the invention is to provide a diagnostic system for an automatic transmission which is able to appropriately determine the presence of any fault of solenoid valves that control the hydraulic pressures applied to friction devices of the automatic transmission, with increased flexibility and freedom, irrespective of the frequency or tendency of operating each of the friction devices of the transmission.

According to one aspect of the invention, there is provided a diagnostic system for an automatic transmission including a plurality of friction devices each of which is switched between an engaged state and a released state in response to a hydraulic pressure of a hydraulic oil supplied from a hydraulic pressure source, and a plurality of solenoid valves capable of regulating the hydraulic pressures of the hydraulic oil supplied to the respective friction devices, the automatic transmission establishing a selected one of gear positions between an input shaft connected to a prime mover and an output shaft connected to driving wheels of a vehicle, by selectively setting the engaged or released state of each of the friction devices through control of energization of a corresponding one of the solenoid valves in accordance with the selected gear position. In the diagnostic system adapted to diagnose the solenoid valves of the automatic transmission so as to determine the presence of faults of the solenoid valves, a solenoid that constitutes each of the solenoid valves is energized under a condition that torque that can drive the driving wheels of the vehicle is not transmitted to the output shaft of the automatic transmission, while a current that passes through the solenoid is monitored, and it is determined that the solenoid valve is at fault when the current monitored does not match a current applied to the solenoid for the energization thereof.

Under the condition as mentioned above, all of the solenoid valves are basically freed from their functions (i.e., actuation of the corresponding friction devices) required of the automatic transmission. Therefore, even if the solenoids of the solenoid valves are forcedly energized for diagnostic purposes, the energization has absolutely no influence on the behavior of the vehicle. Thus, under the above-mentioned condition, fault diagnostics can be performed on any desired solenoid valve or valves, and the presence of faults of the solenoid valves can be appropriately determined with high degrees of flexibility and freedom. If all of the solenoid valves (solenoids) to be diagnosed are normal, the current monitored with respect to each of the solenoids behaves in accordance with the manner of energizing the solenoid. If any of the solenoids suffers a fault, such as a break or disconnection, for example, no current from the solenoid is detected even though the solenoid is energized. Also, if any of the solenoids suffers a fault, such as a short-circuit, a current from the solenoid is detected even though the solenoid is not energized. Thus, the diagnosis of each of the solenoids can be easily accomplished by monitoring the current passing through the solenoid for detection of any abnormality. In view of the fact that the above-described diagnostics can be performed without affecting the behavior of the vehicle at all, each of the solenoids may be energized using a certain test pattern, such as a pattern of regularly spaced pulses, which makes it easy to monitor current passing through the solenoid. In this case, further detailed diagnostics can be performed, which includes a diagnosis as to how the current monitored follows the test pattern according to which each solenoid is energized.

In the diagnostic system for the automatic transmission as described above, it is preferable that the condition that torque that can drive the driving wheels of the vehicle is not transmitted to the output shaft of the automatic transmission is a condition that the hydraulic pressure of the hydraulic oil supplied from the hydraulic pressure source has such a low level that the hydraulic oil cannot actuate the friction devices irrespective of whether the solenoids are energized.

Various conditions may be considered as the condition that torque that can drive the driving wheels of the vehicle is not transmitted to the output shaft of the automatic transmission. If the condition that the hydraulic pressure of the hydraulic oil supplied from the hydraulic pressure source has such a low level that the hydraulic oil cannot actuate the friction devices irrespective of whether the solenoids are energized is employed as the above-mentioned condition, it is possible to easily create a condition or situation that "forced energization of the solenoid of each of the solenoid valves has absolutely no influence on the behavior of the vehicle".

In the diagnostic system for the automatic transmission as described above, it is preferable that the hydraulic pressure source supplies the hydraulic oil to each of the friction devices based on the operation of the prime mover, and that the condition that the hydraulic pressure of the hydraulic oil supplied from the hydraulic pressure source has such a low level that the hydraulic oil cannot actuate the friction devices is satisfied when the operation of the prime mover is stopped.

Generally, the hydraulic pressure source often includes an oil pump that is driven through the operation of the prime mover. In this case, therefore, the above-mentioned condition is easily realized or satisfied when the operation of the prime mover is stopped.

In the diagnostic system for the automatic transmission as described above, it is preferable that the condition that torque that can drive the driving wheels of the vehicle is not transmitted to the output shaft of the automatic transmission is satisfied when an operation to stop the prime mover is performed.

The condition that torque that can drive the driving wheels of the vehicle is not transmitted to the output shaft of the automatic transmission is advantageously satisfied based on the operation to stop the prime mover, namely, the operation to turn the ignition key off. Since a control system of the prime mover is able to cause a main relay connected to a vehicle-mounted battery to be switched off under control thereof, the main relay can be switched off only after various postprocessing, including the above-described diagnostics, is executed subsequently to turn-off of the ignition key. With the above arrangement, the solenoid valves are diagnosed each time the ignition key is operated to the "OFF" position, thus assuring an increased frequency with which each solenoid valve is diagnosed.

In the diagnostic system for the automatic transmission as described above, it is preferable that input torque from the prime mover is transmitted to a gear train of the automatic transmission via at least one particular friction device, and the condition that torque that can drive the driving wheels of the vehicle is not transmitted to the output shaft of the automatic transmission is satisfied when torque transmitted through the above-indicated at least one particular friction device is controlled to be equal to or smaller than a predetermined value.

Generally, the input shaft of the automatic transmission is connected to the output shaft of the prime mover via a particular friction device or devices in the form of, for example, clutches. Therefore, the condition that torque that can drive the driving wheels of the vehicle is not transmitted to the output shaft of the automatic transmission is satisfied if torque transmitted through the particular friction device(s), i.e., clutch(es), is controlled to be equal to or smaller than the predetermined value, more specifically, to be equal to or smaller than torque with which the output shaft of the automatic transmission cannot drive the driving wheels of the vehicle. By setting this particular condition as the above-mentioned condition, the diagnostic system is able to carry out the diagnostic process as described above even while the vehicle is ready to run, namely, while the shift lever of the automatic transmission is placed in the P (parking) range or N (neutral) range.

In the diagnostic system for the automatic transmission as described above, it is preferable that the prime mover comprises an internal combustion engine, and an engine system that controls the operation of the engine has an economy running function of automatically stopping the operation of the engine when predetermined operating conditions of vehicle operating elements are established. It is also preferable that the condition that torque that can drive the driving wheels of the vehicle is not transmitted to the output shaft of the automatic transmission is satisfied when the operation of the internal combustion engine is automatically stopped due to the economy running function.

In recent years, the engine system having the above-described economy running function is employed in many vehicles. Where the engine system is used for controlling the operation of the internal combustion engine, the period of time during which the engine is automatically stopped due to the economy running function is advantageously utilized to satisfy the condition that torque that can drive the driving wheels of the vehicle is not transmitted to the output shaft of the automatic transmission. In this case, each of the solenoid valves is diagnosed with a further increased frequency.

In the diagnostic system for the automatic transmission as described above, it is preferable that the solenoid valves to be diagnosed as to the presence of faults include a solenoid valve capable of regulating a hydraulic pressure of a hydraulic oil supplied to a friction device for use in limp-home running of the vehicle.

In general, the solenoid valve capable of regulating the hydraulic pressure of the hydraulic oil supplied to the friction device used for limp-home running of the vehicle, namely, the solenoid valve for use in limp-home running, is normally diagnosed with a relatively low frequency. However, if the solenoid valve for use in limp-home running goes out of order, the vehicle is not even able to run in the limp-home mode in the event of failure. Thus, the solenoid valve for use in limp-home running is especially required to be diagnosed at regular intervals. In the diagnostic system as described just above, the solenoid valve for use in limp-home running is included in the solenoid valves to be diagnosed according to the invention, and, therefore, the automatic transmission provided with the limp-home running function operates with a high degree of reliability even when the vehicle runs in the limp-home mode. Furthermore, since the above-described diagnostic system can easily select the solenoid valve(s) to be diagnosed, the solenoid valve for use in limp-home running, as well as the other solenoid valves, can be diagnosed with a high degree of freedom.

BRIEF DESCRIPTION OF THE DRAWINGS

The features, advantages, and technical and industrial significance of this invention will be better understood by reading the following detailed description of preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail with reference to exemplary embodiments.

Figure 1:
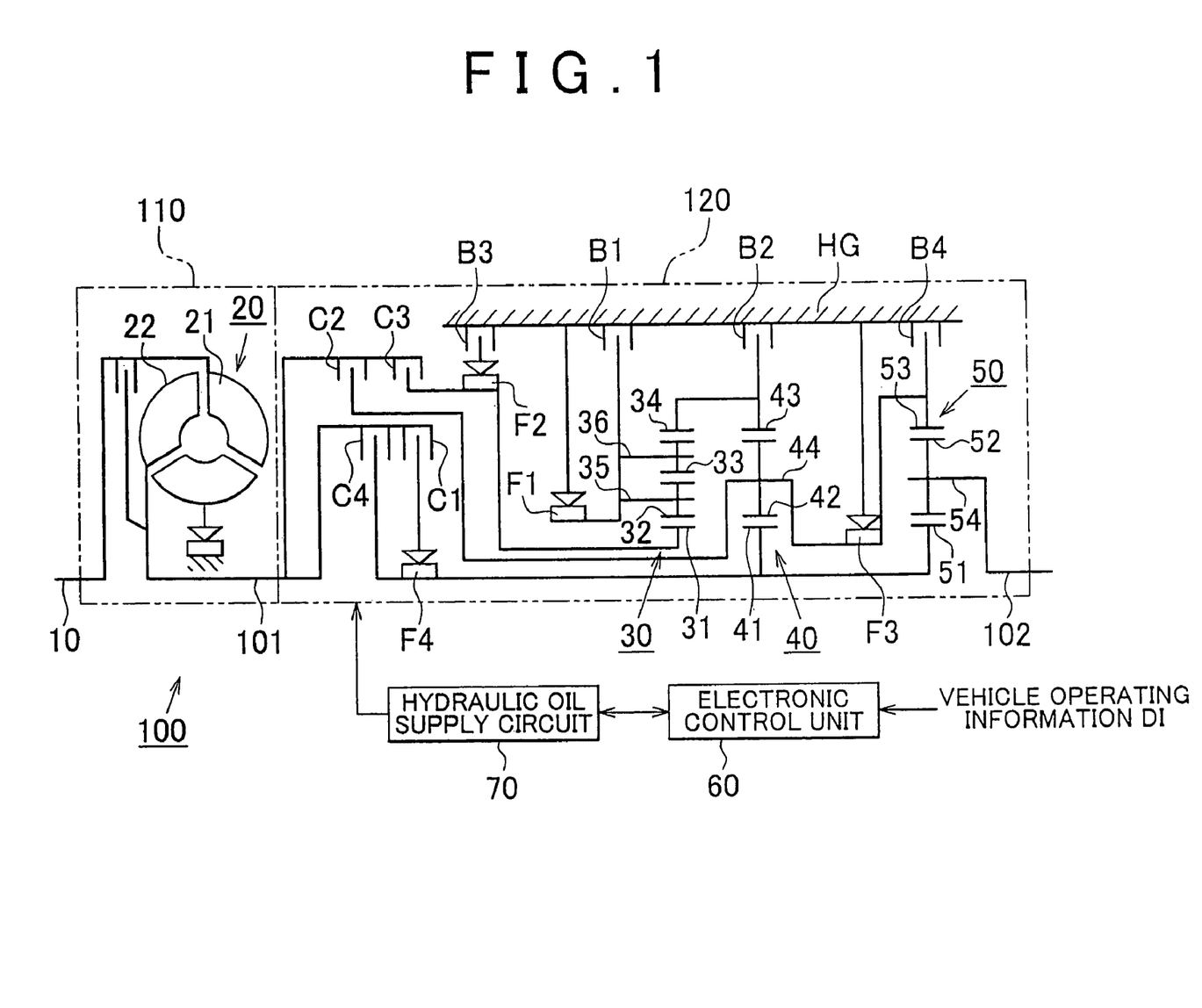
FIG. 1 is a skeleton diagram and a block diagram schematically showing the construction of an automatic transmission to be diagnosed by a diagnostic system according to one embodiment of the invention.

Referring to FIG. 1 through FIG. 4, a diagnostic system for an automatic transmission according to one embodiment of the invention will be described in detail. In this embodiment, the invention is applied to a diagnostic system for a forward six-speed automatic transmission installed on a vehicle. As shown in FIG. 1, the automatic transmission 100 consists principally of an input conversion unit 110 connected to a crankshaft 10 of an internal combustion engine as one example of prime mover installed on the vehicle, and a gear train unit 120 connected to driving wheels of the vehicle via a propeller shaft. The input conversion unit 110 includes a torque converter 20. As well known in the art, the torque converter 20 includes a pump impeller 21 coupled to the crankshaft 10, and a turbine runner 22 coupled to an input shaft 101 of the automatic transmission 100, and is operable to transmit driving force of the crankshaft 10 to the input shaft 101, utilizing flow of a fluid (oil) between the pump impeller 21 and the turbine runner 22.

On the other hand, the gear train unit 120 consists principally of a front planetary gear set 30, a middle planetary gear set 40 and a rear planetary gear set 50 as planetary gear devices. The front planetary gear set 30 consists of a sun gear 31, a ring gear 34, carriers 35, 36, and planetary gears 32, 33 rotatably supported by the carriers 35, 36. The planetary gears 32, 33, which mesh with each other, are disposed between the sun gear 31 and the ring gear 34, such that the planetary gear 32 is engaged with the sun gear 31, and the planetary gear (i.e., pinion) 33 is engaged with the ring gear 34. Also, a clutch C3 is provided between the sun gear 31 and the input shaft 101, and a brake B3 and a one-way clutch F2 are provided between the sun gear 31 and a housing HG of the automatic transmission 100. Furthermore, a brake B1 and a one-way clutch F1 are provided between the carriers 35, 36 and the housing HG.

The middle planetary gear set 40 consists of a sun gear 41, a ring gear 43, a carrier 44, and a planetary gear 42 that is rotatably supported by the carrier 44 and is engaged with the sun gear 41 and the ring gear 43. Clutches C1, C4 and a one-way clutch F4 are provided between the sun gear 41 and the input shaft 101, and a clutch C2 is provided between the carrier 44 and the input shaft 101. Also, a brake B2 is provided between the ring gear 43 and the housing HG. The ring gear 43 of the middle planetary gear set 40 is coupled integrally to the ring gear 34 of the front planetary gear set 30.

The rear planetary gear set 50 consists of a sun gear 51, a ring gear 53, a carrier 54, and a planetary gear 52 that is rotatably supported by the carrier 54 and is engaged with the sun gear 51 and the ring gear 53. A one-way clutch F3 is provided between the ring gear 53 of the rear planetary gear set 50 and the carrier 44 of the middle planetary gear set 40, and a brake B4 is provided between the ring gear 53 and the housing HG. The sun gear 51 of the rear planetary gear set 50 is coupled integrally to the sun gear 41 of the middle planetary gear set 40, and the carrier 54 that supports the planetary gear 52 is coupled integrally to an output shaft 102 of the automatic transmission 100.

Figure 2:
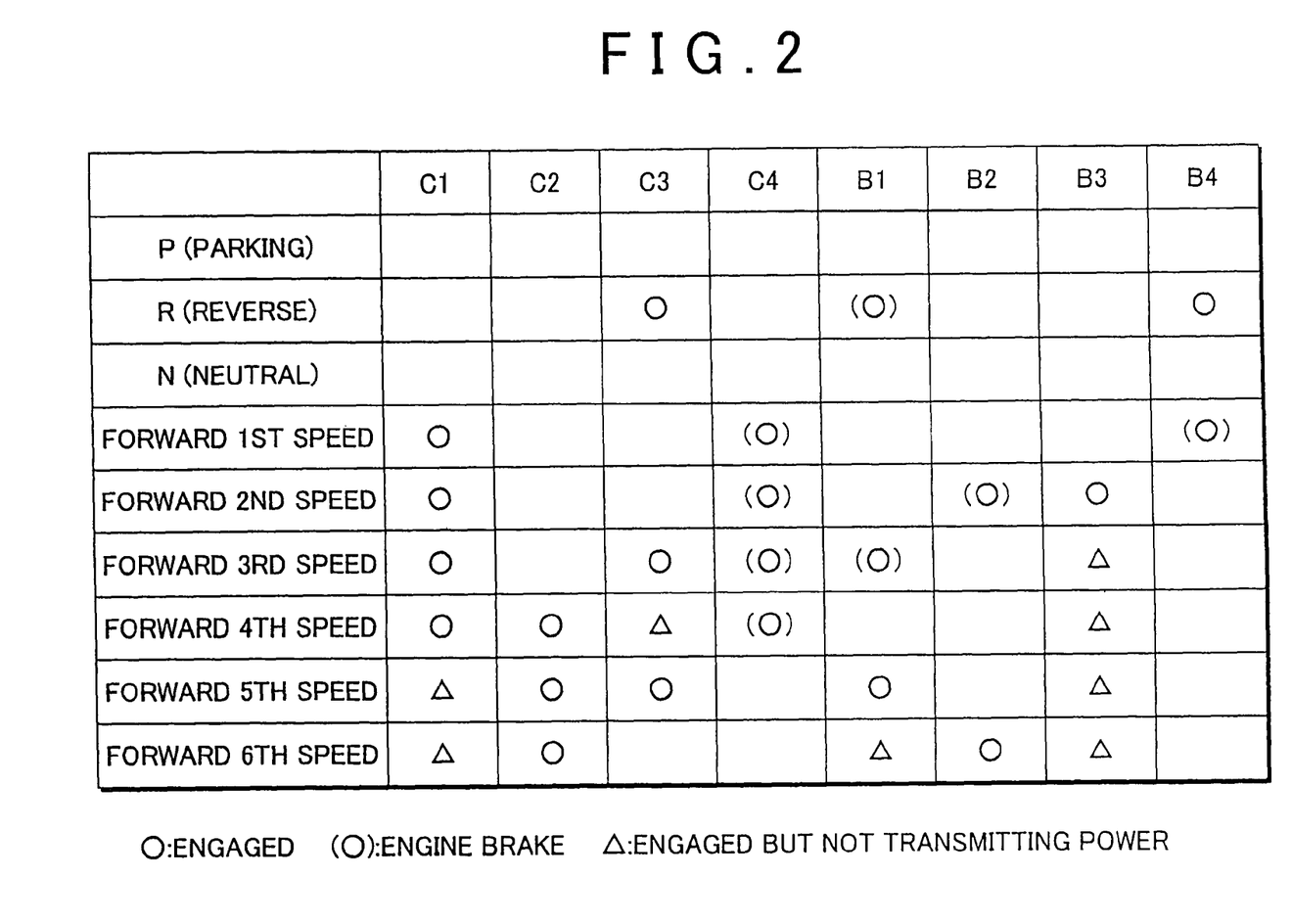
FIG. 2 is a view showing the relationship between the combinations of engaged/released states of respective friction devices that constitute the automatic transmission, and gear positions or speeds established through engagement or release of the friction devices.

As shown in FIG. 1, the automatic transmission 100 is provided with an electronic control unit 60 that controls various operations of the automatic transmission 100 in integrated manners, and a hydraulic oil supply circuit 70 that supplies hydraulic oil to the clutches C1-C4 and brakes B1-B4 as friction devices so as to actuate these friction devices, under control of the electronic control unit 60. More specifically, the electronic control unit 60 selectively establishes the engaged/released states of the respective friction devices by changing oil feed paths of the hydraulic oil supply circuit 70 based on current vehicle operating information or conditions detected as needed by sensors, such as a throttle sensor and a vehicle speed sensor. With the selected friction devices thus engaged or released, power transmission paths of the respective planetary gear sets are changed so as to establish an appropriate gear position between the input shaft 101 and the output shaft 102. In this connection, the automatic transmission 100 to be diagnosed according to the present embodiment is adapted to be shifted to a selected one of one reverse gear position and six forward gear positions having different change gear ratios, by selectively engaging or releasing the friction devices, i.e., the clutches C1-C4 and the brakes B1-B4, as indicated in FIG. 2 showing the combination of the engaged/released states for each of the gear positions. In FIG. 2, "O" represents the engaged state of the friction device (C1-C4, B1-B4) in question, and a blank space represents the released state, while "(O)" represents the engaged state established when an engine brake is applied, and "Δ" represents engagement that does not contribute to power transmission.

Figure 3:
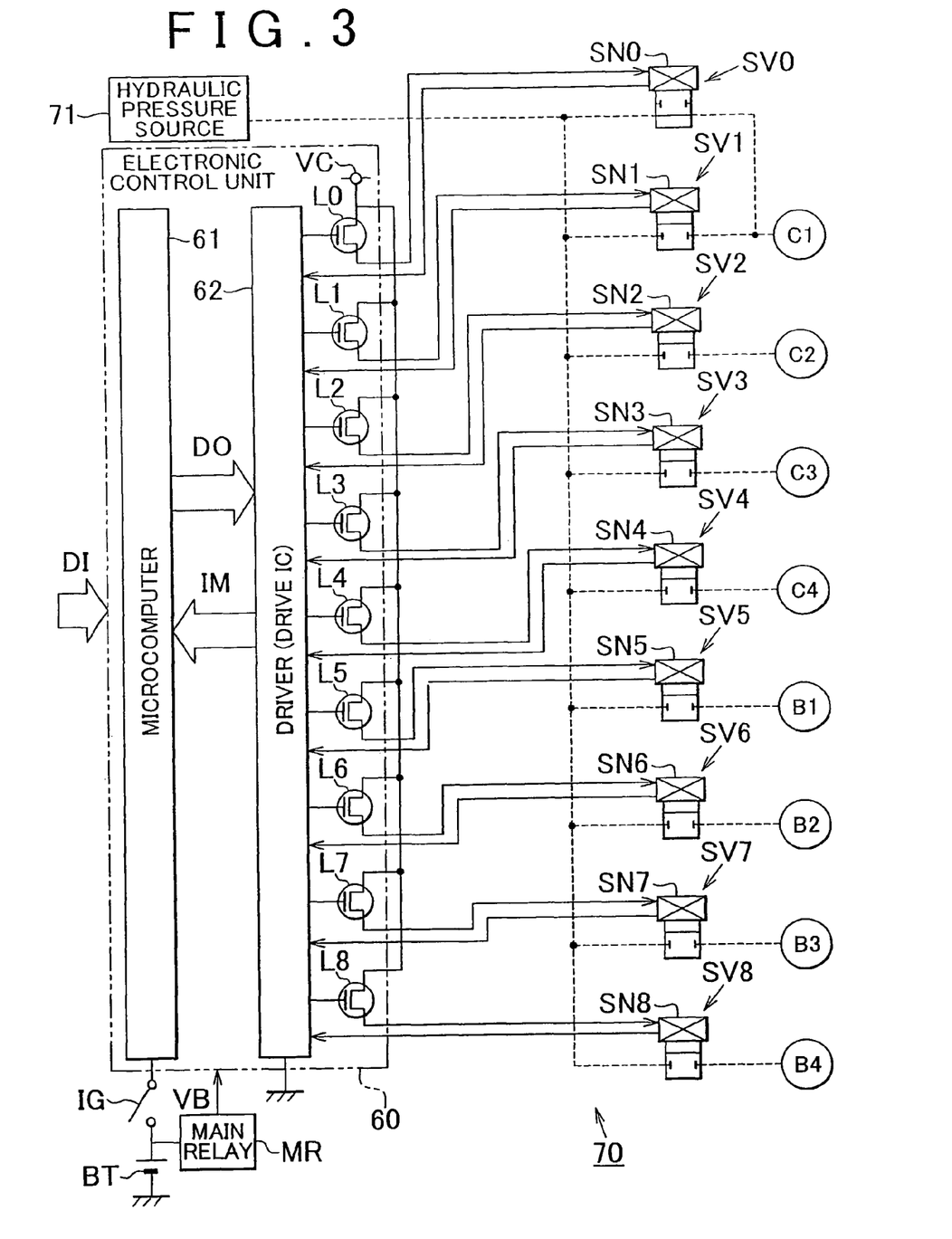
FIG. 3 is a block diagram showing the arrangements of an electronic control unit and a hydraulic oil supply circuit of the automatic transmission, which mainly constitute the diagnostic system of the embodiment of FIG. 1.

Referring next to FIG. 3, the specific arrangements of the hydraulic oil supply circuit 70 and electronic control unit 60 will be described. As shown in FIG. 3, the hydraulic oil supply circuit 70 is provided with a hydraulic pressure source 71 including an oil pump that is driven based on rotation of the crankshaft 10 of the engine, and the hydraulic oil fed from the hydraulic pressure source 71 is supplied to the friction devices, i.e., the clutches C1-C4 and brakes B1-B4, via respective supply passages. In the supply passages, normally closed type solenoid valves SV1-SV8 are respectively provided in conjunction with the clutches C1-C4 and brakes B1-B4 as the friction devices. When each of solenoids SN1-SN8 that constitute the solenoid valves SV1-SV8 is energized, the corresponding solenoid valve is opened, and the friction device corresponding with the opened solenoid valve is engaged. When each of the solenoids SN1 to SN8 is de-energized, on the other hand, the corresponding solenoid valve is closed, and the friction device corresponding with the closed solenoid valve is released.

Also, a solenoid valve SV0 for use in limp-home running of the vehicle is further provided in conjunction with the clutch C1 as one of the friction devices. The solenoid valve SV0 is a normally open type solenoid valve, which is closed when its solenoid SN0 is energized and is opened when the solenoid SN0 is de-energized. During normal running of the vehicle, the solenoid SN0 is kept energized, and the solenoid valve SV0 is held in the closed state. If it becomes impossible to energize the solenoid valves including the solenoid valve SV0 because of, for example, a breakdown of the electronic control unit 60, only the solenoid valve SV0 is placed in the open state. As a result, only the clutch C1, as one of the friction devices, is engaged so as to establish the forward 1st-speed gear position in the case of this embodiment, and the vehicle is allowed to run in a limp-home mode as one type of fail-safe mode.

The electronic control unit 60 includes a microcomputer 61 that generates drive commands DO based on which the energized conditions (energization/de-energization) of the respective solenoids SN0-SN8 of the solenoid valves SV0-SV8 are controlled. The electronic control unit 60 also includes drive transistors L0-L8 provided in conjunction with the respective solenoid valves SV0-SV8 for driving the solenoid valves SV0-SV8, respectively. The electronic control unit 60 further includes a driver (drive IC) 62 that receives a drive command DO from the microcomputer 61, and generates a drive signal in response to the drive command DO so as to bring a corresponding one of the drive transistors L0-L8 into the "ON" state. If the microcomputer 61 generates a command to open the solenoid valve SV1, for example, as the drive command DO, the command is transmitted to the drive transistor L1 via the driver 62 to bring the drive transistor L1 into the "ON" state, and current passes through the solenoid SN1 to open the solenoid valve SV1 only during a period in which the drive transistor L1 is in the "ON" state. With the solenoid valve SV1 thus opened, the clutch C1 as one of the friction devices is engaged, as is understood from the above description.

In the present embodiment, the electronic control unit 60 also functions as a diagnostic system for diagnosing the solenoid valves SV0-SV8. In the electronic control unit 60, a current passing through each of the solenoid valves SV0-SV8 is drawn into the driver 62, and is converted into a corresponding voltage via a shunt resistor, or the like, in the driver 62. Then, a monitor signal created based on the voltage, which will be called "current monitor signal IM", is transmitted from the driver 62 to the microcomputer 61. The microcomputer 61 then determines whether the current monitor signal IM thus received matches the drive command DO, namely, whether the current monitor signal IM indicates passage of current responsive to the drive command DO. On the basis of this determination, the microcomputer 61 is able to make a diagnosis as to whether a fault, such as disconnection or a short-circuit, occurs to any of the solenoids SN0-SN8 that constitute the solenoid valves SV0-SV8. In the present embodiment, such diagnostics are carried out after the ignition switch IG is operated to the OFF position.

As well known in the art, the electronic control unit 60 is able to perform control operations when receiving current from a vehicle-mounted battery BT via a main relay MR that is held in the ON state once the ignition switch IG is operated to the "ON" position. Namely, in response to turn-on of the ignition switch IG, the electronic control unit 60 closes (i.e., switches on) an internal contact of the main relay MR, and receives the voltage VB of the vehicle-mounted battery BT via the main relay MR. The electronic control unit 60 then creates drive voltage for driving the microcomputer 61 and the driver 62, based on the voltage VB, and also creates drive voltage VC for driving the solenoid valves SV0-SV8.

When the ignition switch IG is operated to the OFF position, the microcomputer 61 opens (i.e., switches off) the internal contact of the main relay MR so as to stop supply of current from the vehicle-mounted battery BT to the electronic control device 60, after finishing predetermined postprocessing including the diagnostic process as described above.

Figure 4:
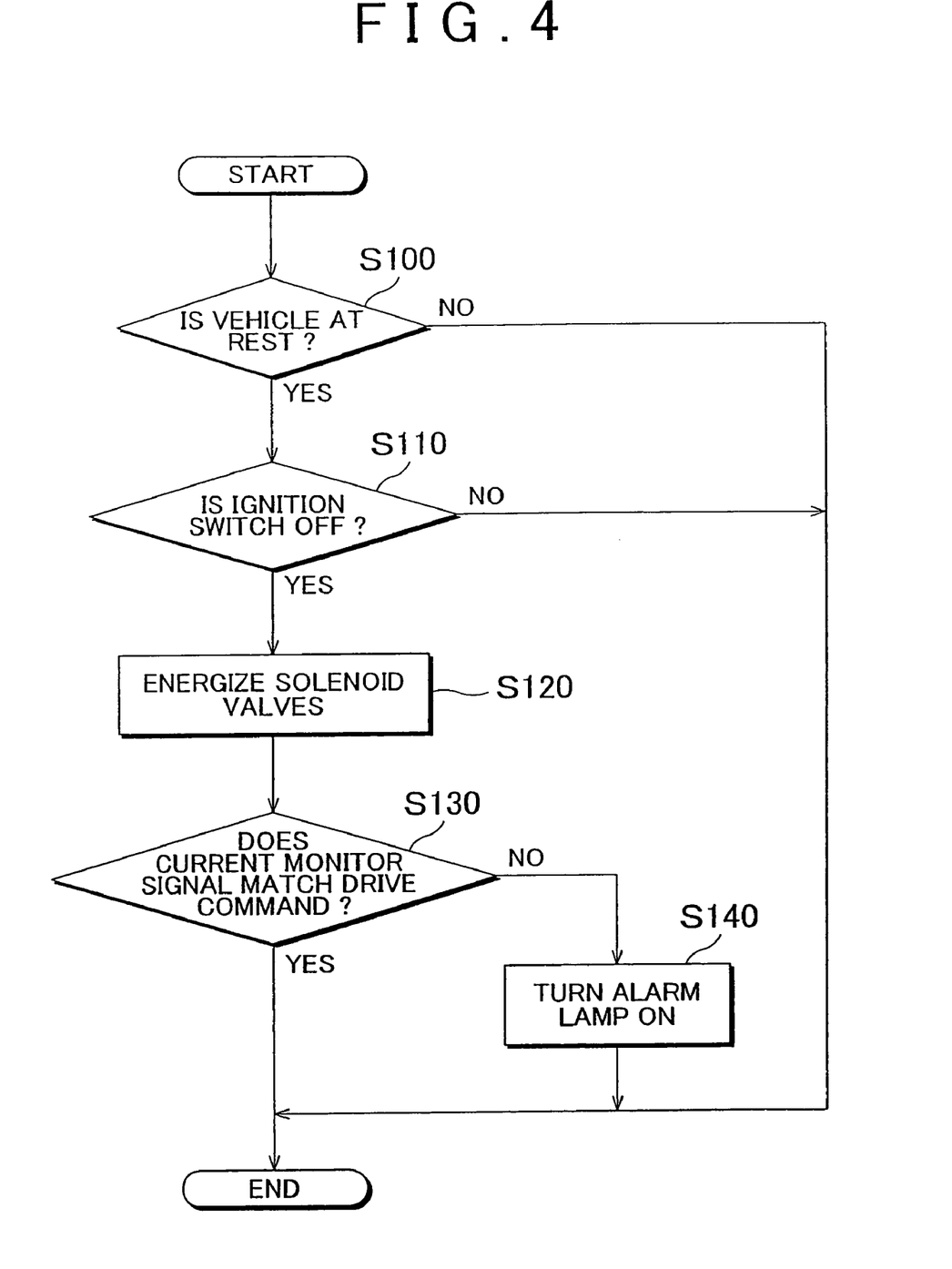
FIG. 4 is a flowchart illustrating a control routine of a fault diagnostic process according to which the diagnostic system of the embodiment of FIG. 1 performs a fault diagnosis of each solenoid valve.

FIG. 4 is a flowchart illustrating a control routine of the diagnostic process performed by the diagnostic system in the form of the electronic control device 60. In the following description, the operation of the diagnostic system will be described in detail with reference to FIG. 4.

In the conventional diagnostic system as described above, when the automatic transmission is shifted from one gear position to another, a change in the hydraulic pressure supplied to each of the friction devices whose engaged/released state is to be changed for shifting is monitored by means of, for example, a hydraulic switch, so that the presence of a fault of the corresponding solenoid valve is determined based on the pressure change. In this case, the frequency with which each of the solenoid valves is diagnosed inevitably varies from one solenoid valve to another since it depends upon the manner of operating the automatic transmission. Therefore, if the automatic transmission is less likely to be shifted to a particular gear position due to, for example, the driving practices of the driver, each of the solenoid valves corresponding with the friction devices whose engaged/released state is to be changed for shifting to the particular gear position is diagnosed with a reduced frequency, thus leaving a problem in terms of the flexibility and freedom in the operation of the diagnostic system. This problem is particularly serious where the automatic transmission includes the solenoid valve SV0 for use in limp-home running. In the present embodiment, therefore, the diagnostic system carries out fault diagnoses of the solenoid valves SV0-SV8 by freely energizing the respective solenoids SN0-SN8 after the vehicle is stopped, namely, after turn-off of the ignition switch IG is detected.

In the diagnostic process as shown in FIG. 4, it is initially determined in step S100 whether the vehicle is at rest, based on, for example, the rotational speed of the output shaft 102 detected by a sensor for detecting the rotational speed of the output shaft 102. If it is determined that the vehicle is at rest (i.e., if an affirmative decision (YES) is made in step S100), it is then determined in step S110 whether the ignition switch IG has been operated to the OFF position. If step S110 determines that the ignition switch IG has been operated to the OFF position, this determination triggers a substantial diagnostic process that starts upon execution of step S120.

In step S120 of the diagnostic process, the microcomputer 61 successively brings the drive transistors L0-L8 into the "ON" states, via the driver 62, so as to successively energize the solenoids SN0-SN8 of the solenoid valves SV0-SV8 by forcing current to pass through the solenoids, as described above. For each of the solenoids SN0-SN8 thus forcedly energized, the microcomputer 61 receives a corresponding current monitor signal IM, and determines in step S130 whether the current monitor signal IM behaves in accordance with the drive command DO as a command for the forced energization, namely, whether the current monitor signal IM indicates passage of current as dictated by the drive command DO. If all of the solenoid valves are normal, the current monitor signal IM corresponding to each of the solenoids energized through the drive command DO indicates that current has passed through the solenoid over an energization period specified by the drive command DO. If not all of the solenoid valves are normal, various phenomena including (A) and (B) below may result: (A) passage of current through a certain solenoid cannot be recognized from the corresponding current monitor signal IM even though the solenoid was forced to be energized in response to the drive command DO, and (B) passage of current through a certain solenoid is recognized from the corresponding current monitor signal IM even though the solenoid is not forced to be energized in response to the drive command DO. In the case of (A), the solenoid in question may suffer a fault, such as disconnection or a ground fault. In the case of (B), the solenoid in question may suffer a fault, such as a short circuit; for example, the solenoid may be short-circuited to a feed wire for supplying the drive voltage VC to the solenoid. If it is determined in step S130 that the phenomenon of (A) or (B) appears, the control goes to step S140 to turn on an alarm lamp provided on, for example, an operation panel in the vehicle compartment, and finish the diagnostic process. In this case, information on the fault is normally written into a suitable nonvolatile memory in the electronic control unit 60, and, upon the next start of the vehicle, the vehicle is operated in the limp-home mode as described above, based on the fault information.

The present embodiment as described above provides the following effects or advantages. (1) The fault diagnosis of each solenoid valve is performed under a condition that the ignition switch IG is operated to the OFF position. When the ignition switch IG is turned off, the engine is stopped, and the hydraulic pressure of the hydraulic oil supplied from the hydraulic pressure source 71 is reduced to such a low level that the hydraulic oil cannot actuate each of the friction devices, irrespective of whether the solenoid of each solenoid valve is energized or not. In other words, all of the solenoid valves SV0-SV are freed from its functions (i.e., actuation of the friction devices) required of the automatic transmission 100. Therefore, even if the solenoids of the solenoid valves SV0-SV8 are forced to be energized for diagnostic purposes, the energization has no influence on the behavior of the vehicle, and the fault diagnosis can be performed on any desired one or ones of the solenoid valves. Thus, the presence of a fault of any solenoid valve can be appropriately determined with increased flexibility and freedom.

(2) The diagnoses of the solenoid valves as described above are carried out each time the ignition switch IG is operated to the OFF position. Thus, each of the solenoid valves is diagnosed with an increased frequency. (3) If all of the solenoid valves (solenoids) to be diagnosed are normal, the current monitor signal IM for each of the solenoid valves matches the drive command (DO) issued to the solenoid valve. If any of the solenoids suffers a fault, such as disconnection, for example, no current from the solenoid is detected even though the solenoid is energized. If any of the solenoids suffers a fault, such as a short-circuit, current from the solenoid is detected even though the solenoid is not energized. Thus, the diagnosis of each of the solenoid valves (or solenoids) can be easily accomplished through detection of the current passing through the solenoid.

(4) Since the diagnosis as described above is also performed with respect to the solenoid valve SV0 for use in limp-home running, the automatic transmission 100 adaptable to the limp-home mode of operation operates with a high degree of reliability even when the vehicle runs in the limp-home mode. Furthermore, since the above-described diagnostic system can easily select the solenoid valve(s) to be diagnosed, the solenoid valve SV0 for use in limp-home running, as well as the solenoid valves for actuating the friction devices, can be diagnosed with a high degree of freedom.

The illustrated embodiment may be modified as needed in the manners as will be hereinafter described. (a) In view of the fact that the above-described diagnostics can be performed without affecting the behavior of the vehicle at all, each of the solenoids may be energized using a certain test pattern, such as a pattern of regularly spaced pulses, which makes it easy to monitor current passing through the solenoid. In this case, further detailed diagnostics can be performed, which includes a diagnosis as to how the current monitored follows the test pattern according to which each solenoid is energized.

Figure 5:
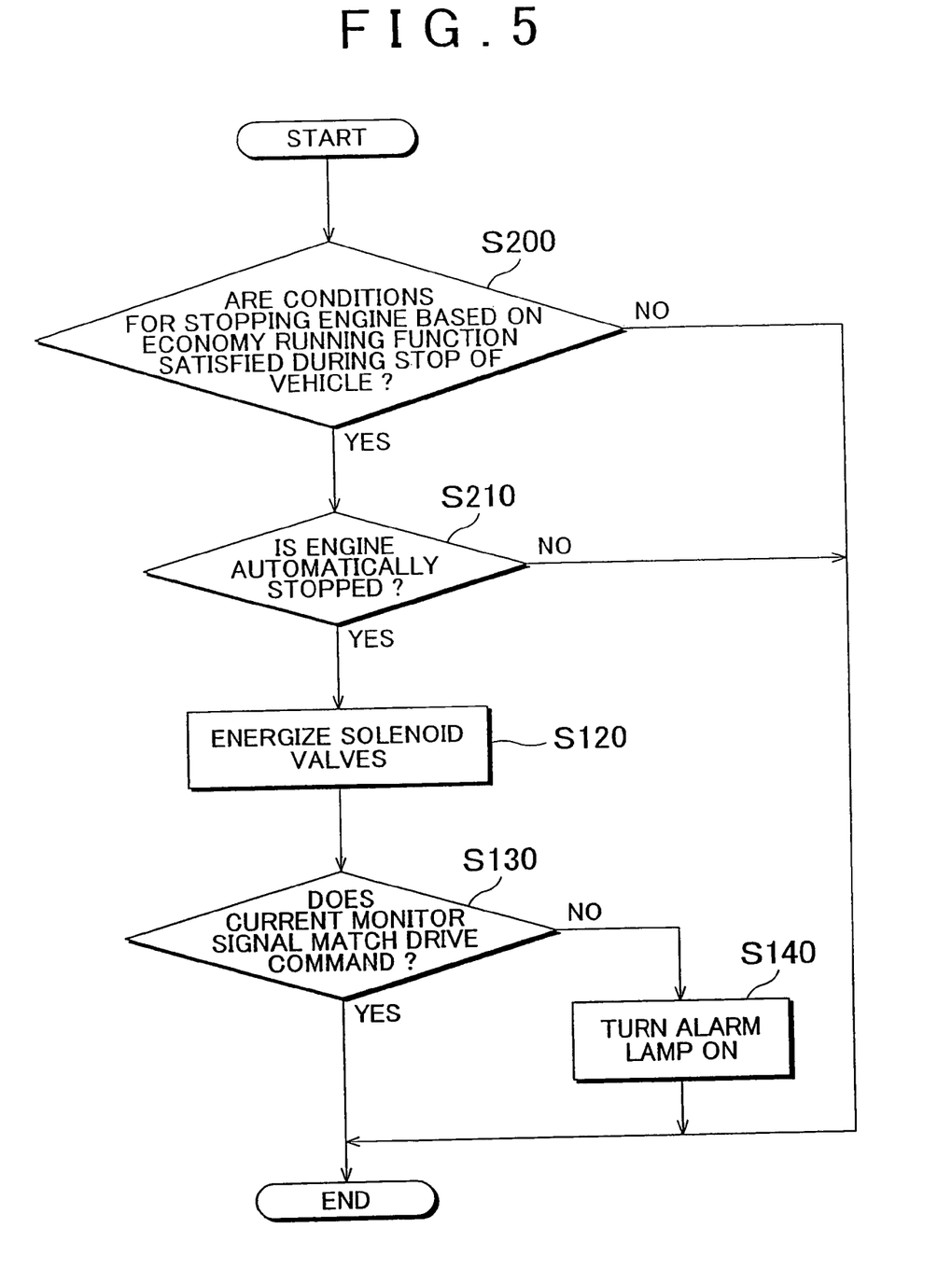
FIG. 5 is a flowchart illustrating a control routine of a fault diagnostic process according to a first modified example of the embodiment of FIG. 1.

(b) While the diagnostic process is performed under the condition that the ignition switch IG is operated to the OFF position in the illustrated embodiment, conditions for implementation of the diagnostic process is not limited to this condition. For example, in the case where an engine system for controlling operation of the internal combustion engine has an economy running function of automatically stopping the operation of the engine when certain operating conditions of vehicle driving/operating elements are satisfied, the diagnostics as described above may be performed during a period in which the engine is automatically stopped due to the economy running function. FIG. 5 is a flowchart illustrating a diagnostic process performed in this manner according to a first modified example of the illustrated embodiment. In the first modified example, conditions for starting diagnostics are presented, by way of example, in steps S200 and S210 of FIG. 5. If the engine is in a stopped condition (i.e., if the condition of step S210 is satisfied), a solenoid of each solenoid valve can be energized without affecting the behavior of the vehicle at all. With the diagnostic process as shown in FIG. 5, the frequency of diagnosis of each solenoid valve is further increased. The diagnostic process of FIG. 5 may be implemented along with the process of the illustrated embodiment as shown in FIG. 4.

Figure 6:
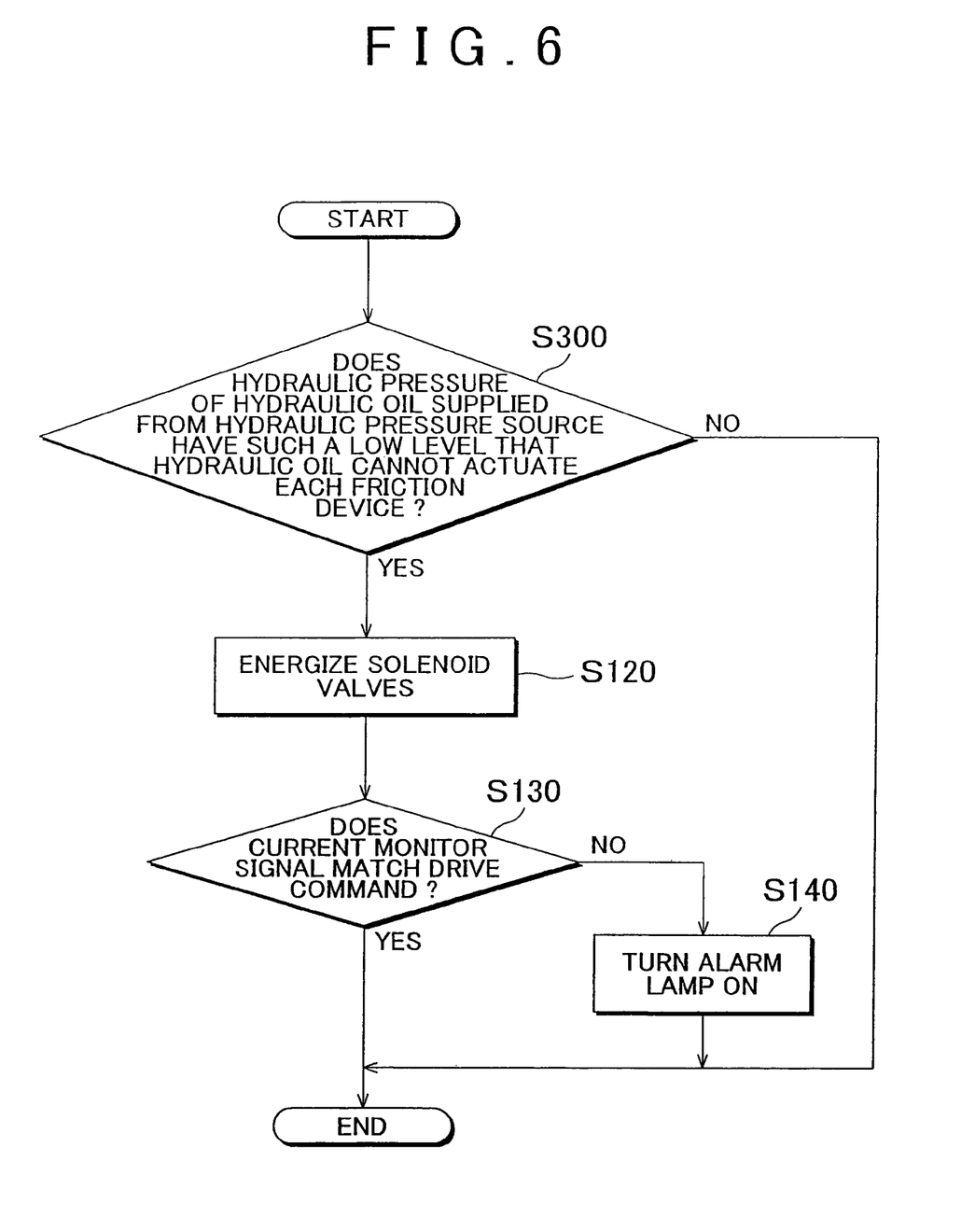
FIG. 6 is a flowchart illustrating a control routine of a fault diagnostic process according to a second modified example of the embodiment of FIG. 1.

(c) In the case where a hydraulic pressure source that is driven by another type of prime mover, such as an electric motor, is employed as the hydraulic pressure source, the above diagnostic process is not necessarily carried out under the condition that the internal combustion engine is stopped. Namely, the diagnostic process may be performed under a condition that the hydraulic pressure of the hydraulic oil supplied from the hydraulic pressure source is reduced to such a lower level that the hydraulic fluid cannot actuate each of the friction devices. This condition may be satisfied when a driving means (e.g., a motor) for driving the hydraulic pressure source is stopped. FIG. 6 is a flowchart illustrating a diagnostic process performed in this manner according to a second modified example of the illustrated embodiment. In the second modified example, a condition for starting diagnostics is presented, by way of example, in step S300 of FIG. 6. In this case, a solenoid of each solenoid valve can be energized without affecting the behavior of the vehicle, even during operation of the internal combustion engine.

Figure 7:
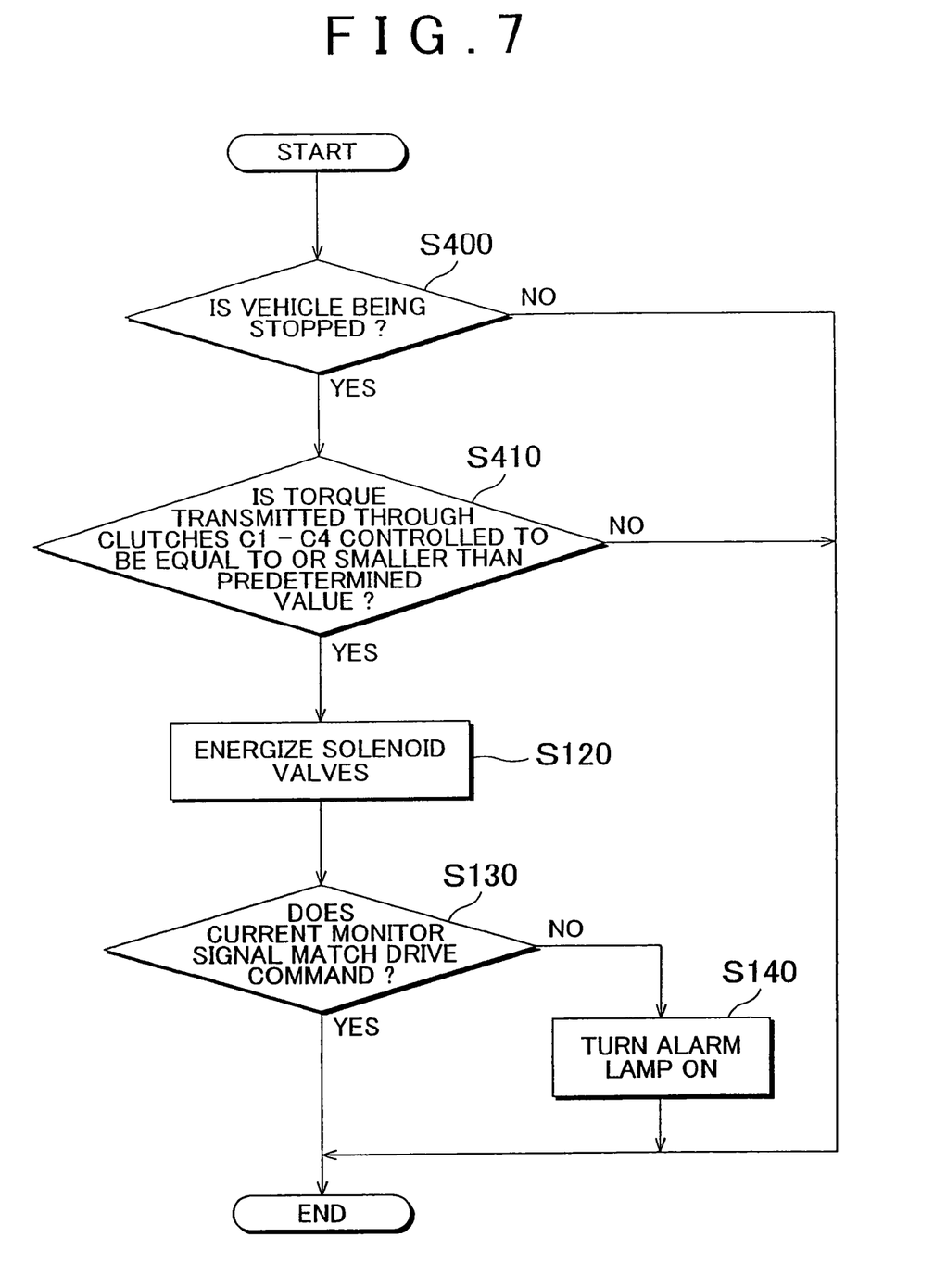
FIG. 7 is a flowchart illustrating a control routine of a fault diagnostic process according to a third modified example of the embodiment of FIG. 1.

(d) Other conditions for starting diagnostics may also be employed. For example, the diagnostic process may be started under a condition that torque transmitted through particular friction devices (i.e., clutches C1-C4) connected to the input shaft 101 of the automatic transmission 100 is controlled to be equal to or smaller than a predetermined value. If this condition is set as a condition for starting diagnostics, the diagnostic process may be carried out while the vehicle is being stopped but is ready to run, namely, while the shift lever of the automatic transmission is placed in the P (parking) range or N (neutral) range. FIG. 7 is a flowchart illustrating a diagnostic process performed in this manner according to a third modified example of the illustrated embodiment. In the third modified example, conditions for starting diagnostics are presented, by way of example, in steps S400 and S410 of FIG. 7. Summing up the conditions for starting diagnostics as exemplified above, any conditions may suffice under which torque that can drive the driving wheels of the vehicle is not transmitted to the output shaft of the automatic transmission.

(e) While the invention is applied to the diagnostic system for use with the forward six-speed automatic transmission in the illustrated embodiment, the specifications of the automatic transmission to be diagnosed, or the specifications of the solenoid valves used in the transmission, are not limited to those as illustrated above, but may be selected as desired.

The invention claimed is:

1. A diagnostic system for an automatic transmission including a plurality of friction devices each of which is switched between an engaged state and a released state in response to a hydraulic pressure of a hydraulic oil supplied from a hydraulic pressure source, and a plurality of solenoid valves capable of regulating the hydraulic pressures of the hydraulic oil supplied to the respective friction devices, said automatic transmission establishing a selected one of gear positions between an input shaft connected to a prime mover and an output shaft connected to driving wheels of a vehicle, by selectively setting the engaged or released state of each of the friction devices through control of energization of a corresponding one of the solenoid valves in accordance with the selected gear position, said diagnostic system being adapted to diagnose the solenoid valves of the automatic transmission so as to determine the presence of faults of the solenoid valves, the diagnostic system comprising:

a diagnostic device that energizes a solenoid that constitutes each of the solenoid valves under a condition that torque that can drive the driving wheels of the vehicle is not transmitted to the output shaft of the automatic transmission, while monitoring a current that passes through the solenoid, and that determines that the solenoid valve is at fault when the current monitored does not match a current applied to the solenoid for the energization thereof, wherein the condition that torque that can drive the driving wheels of the vehicle is not transmitted to the output shaft of the automatic transmission is a condition that the hydraulic pressure of the hydraulic oil supplied from the hydraulic pressure source has such a low level that the hydraulic oil cannot actuate the friction devices irrespective of whether the solenoids are energized.

2. A diagnostic system for an automatic transmission according to claim 1, wherein the hydraulic pressure source supplies the hydraulic oil to each of the friction devices based on the operation of the prime mover, and the condition that the hydraulic pressure of the hydraulic oil supplied from the hydraulic pressure source has such a low level that the hydraulic oil cannot actuate the friction devices is satisfied when the operation of the prime mover is stopped.

3. A diagnostic system for an automatic transmission according to claim 2, wherein the operation to stop the prime mover is performed by turning off the ignition key.

4. A diagnostic system for an automatic transmission according to claim 2, wherein the prime mover comprises an internal combustion engine, and an engine system that controls the operation of the engine has an economy running function of automatically stopping the operation of the engine when predetermined operating conditions of vehicle operating elements are established; and the operation of the internal combustion engine is automatically stopped due to the economy running function.

5. A diagnostic system for an automatic transmission according to claim 1, wherein input torque from the prime mover is transmitted to a gear train of the automatic transmission via at least one particular friction device, and the condition that torque that can drive the driving wheels of the vehicle is not transmitted to the output shaft of the automatic transmission is satisfied when torque transmitted through said at least one particular friction device is controlled to be equal to or smaller than a predetermined value.

6. A diagnostic system for an automatic transmission according to claim 1, wherein the solenoid valves to be diagnosed as to the presence of faults include a solenoid valve capable of regulating a hydraulic pressure of a hydraulic oil supplied to a friction device for use in limp-home running of the vehicle.

7. A diagnostic system for an automatic transmission including a plurality of friction devices each of which is switched between an engaged state and a released state in response to a hydraulic pressure of a hydraulic oil supplied from a hydraulic pressure source, and a plurality of solenoid valves capable of regulating the hydraulic pressures of the hydraulic oil supplied to the respective friction devices, said automatic transmission establishing a selected one of gear positions between an input shaft connected to a prime mover and an output shaft connected to driving wheels of a vehicle, by selectively setting the engaged or released state of each of the friction devices through control of energization of a corresponding one of the solenoid valves in accordance with the selected gear position, said diagnostic system being adapted to diagnose the solenoid valves of the automatic transmission so as to determine the presence of faults of the solenoid valves, comprising:

an energizing device that energizes a solenoid that constitutes each of the solenoid valves under a condition that torque that can drive the driving wheels of the vehicle is not transmitted to the output shaft of the automatic transmission;

a monitoring device that monitors a current that passes through the solenoid energized by the energizing device; and a determining device that determines that the solenoid valve is at fault when the current monitored by the monitoring device does not match a current applied to the solenoid by the energizing device;

wherein the condition that torque that can drive the driving wheels of the vehicle is not transmitted to the output shaft of the automatic transmission comprises a condition that the hydraulic pressure of the hydraulic oil supplied from the hydraulic pressure source has such a low level that the hydraulic oil cannot actuate the friction devices irrespective of whether the solenoids are energized.

8. A diagnostic system for an automatic transmission according to claim 7, wherein the hydraulic pressure source supplies the hydraulic oil to each of the friction devices based on the operation of the prime mover, and the condition that the hydraulic pressure of the hydraulic oil supplied from the hydraulic pressure source has such a low level that the hydraulic oil cannot actuate the friction devices is satisfied when the operation of the prime mover is stopped.

9. A diagnostic system for an automatic transmission according to claim 7 wherein the condition that torque that can drive the driving wheels of the vehicle is not transmitted to the output shaft of the automatic transmission is satisfied when an operation to stop the prime mover is performed by turning off the ignition key.

10. A diagnostic system for an automatic transmission according to claim 7, wherein input torque from the prime mover is transmitted to a gear train of the automatic transmission via at least one particular friction device, and the condition that torque that can drive the driving wheels of the vehicle is not transmitted to the output shaft of the automatic transmission is satisfied when torque transmitted through said at least one particular friction device is controlled to be equal to or smaller than a predetermined value.

11. A diagnostic system for an automatic transmission according to claim 7, wherein:

the prime mover comprises an internal combustion engine, and an engine system that controls the operation of the engine has an economy running function of automatically stopping the operation of the engine when predetermined operating conditions of vehicle operating elements are established; and the condition that torque that can drive the driving wheels of the vehicle is not transmitted to the output shaft of the automatic transmission is satisfied when the operation of the internal combustion engine is automatically stopped due to the economy running function.

12. A diagnostic system for an automatic transmission according to claim 7, wherein the solenoid valves to be diagnosed as to the presence of faults include a solenoid valve capable of regulating a hydraulic pressure of a hydraulic oil supplied to a friction device for use in limp-home running of the vehicle.

* * * * *